US012001169B2

(12) United States Patent
Funakawa

(10) Patent No.: US 12,001,169 B2
(45) Date of Patent: Jun. 4, 2024

(54) WATCH COMPONENT, WATCH MOVEMENT AND WATCH

(71) Applicant: Seiko Epson Corporation, Tokyo (JP)

(72) Inventor: Takeo Funakawa, Chino (JP)

(73) Assignee: SEIKO EPSON CORPORATION (JP)

( * ) Notice: Subject to any disclaimer, the term of this patent is extended or adjusted under 35 U.S.C. 154(b) by 389 days.

(21) Appl. No.: 16/929,212

(22) Filed: Jul. 15, 2020

(65) Prior Publication Data

US 2021/0018875 A1 Jan. 21, 2021

(30) Foreign Application Priority Data

Jul. 16, 2019 (JP) ................................ 2019-131022

(51) Int. Cl.

*G04B 45/02* (2006.01)
*G04B 1/16* (2006.01)
*G04B 13/02* (2006.01)
*G04B 17/06* (2006.01)
*G04B 17/32* (2006.01)

(52) U.S. Cl.

CPC ............... *G04B 17/32* (2013.01); *G04B 1/16* (2013.01); *G04B 13/02* (2013.01); *G04B 17/063* (2013.01); *G04B 45/02* (2013.01)

(58) Field of Classification Search

CPC ........ G04B 17/32; G04B 13/02; G04B 45/02; G04B 17/063; G04B 1/16

See application file for complete search history.

(56) References Cited

U.S. PATENT DOCUMENTS

2002/0131332 A1* 9/2002 Kaelin ................. G04B 37/081 368/294
2004/0150869 A1 8/2004 Kasai
2009/0081476 A1* 3/2009 Saucy .................. G04B 29/027 428/614
2014/0356638 A1* 12/2014 Wang ...................... C23C 14/35 204/192.27
2016/0161640 A1* 6/2016 Furusato .................. G02B 1/18 359/601
2016/0378064 A1* 12/2016 Gandelhman .......... G04B 19/12 368/139
2017/0068221 A1 3/2017 Dubois
2017/0168460 A1* 6/2017 Willemin ............... G04C 10/02
2018/0004161 A1 1/2018 Gaff et al.

(Continued)

FOREIGN PATENT DOCUMENTS

CH 713536 A2 9/2018
JP H04-318491 A 11/1992

(Continued)

*Primary Examiner* — Sean Kayes

(74) *Attorney, Agent, or Firm* — Harness, Dickey & Pierce, P.L.C.

(57) ABSTRACT

For example, an escape gear portion as a watch component includes a substrate containing silicon as a main component, and a light reflecting layer including a first silicon oxide layer, a silicon layer, and a second silicon oxide layer that are stacked, in this order, at the substrate, wherein, when the light reflecting layer is viewed in plan view, the light reflecting layer includes a first region and a second region, and a thickness of the silicon layer in the first region is different from a thickness of the silicon layer in the second region.

2 Claims, 10 Drawing Sheets

(56) References Cited

U.S. PATENT DOCUMENTS

| | | | | |
|---|---|---|---|---|
| 2018/0104771 | A1* | 4/2018 | Cusin | B23K 26/21 |
| 2018/0142749 | A1* | 5/2018 | Maennicke | F16F 1/10 |
| 2018/0150029 | A1 | 5/2018 | Shibuya et al. | |
| 2018/0372150 | A1* | 12/2018 | Papi | G04B 15/14 |
| 2018/0373201 | A1* | 12/2018 | Tu | G04B 15/10 |
| 2019/0076876 | A1* | 3/2019 | Shibuya | G04B 15/14 |
| 2021/0018875 | A1 | 1/2021 | Funakawa | |

FOREIGN PATENT DOCUMENTS

| | | | |
|---|---|---|---|
| JP | 2016-114407 | A | 6/2016 |
| JP | 2017-053853 | A | 3/2017 |
| JP | 2018-087736 | A | 6/2018 |
| WO | 93/17593 | A1 | 9/1993 |
| WO | 2015-087252 | A1 | 6/2015 |

* cited by examiner

WATCH COMPONENT, WATCH MOVEMENT AND WATCH

The present application is based on, and claims priority from JP Application Serial Number 2019-131022, filed Jul. 16, 2019, the disclosure of which is hereby incorporated by reference herein in its entirety.

BACKGROUND

1. Technical Field

The present disclosure relates to a watch component, a watch movement, and a watch.

2. Related Art

Traditionally, a watch component has been formed by machining a metal material. In recent years, however, a substrate containing silicon has been used as a material for watch components, from a perspective of weight reduction, and a perspective of workability.

In addition, in a watch component, not only for components that are exposed to an exterior of the watch and used, but also for components built into the watch, decorativeness is required.

For example, JP-A-2017-053853 discloses a method for forming a decorative surface of a micro-mechanical watch component including a silicon-based substrate.

The method described in JP-A-2017-053853 includes at least one step of forming small holes on a surface of the silicon-based substrate, over an entire region of the silicon-based substrate corresponding to the decorative surface to be formed. The small hole is designed to open outwardly in an outer surface of the micro-mechanical watch component.

However, in the micro-mechanical watch component described in JP-A-2017-053853, strength of an entirety of the component tends to reduce, because the decorative surface is formed by the small holes formed by scraping the substrate. In a watch component, there is a demand for decorativeness to be further improved without making convexity and concavity on a substrate.

SUMMARY

A watch component of the present disclosure includes a substrate containing silicon as a main component, and a light reflecting layer including a first silicon oxide layer, a silicon layer, and a second silicon oxide layer that are stacked, in this order, at the substrate, wherein, when the light reflecting layer is viewed in plan view, the light reflecting layer includes a first region and a second region, and a thickness of the silicon layer in the first region and a thickness of the silicon layer in the second region are different from each other.

In the watch component of the present disclosure, a dimensional difference between the thickness of the silicon layer in the first region and the thickness of the silicon layer in the second region may be from 5 nm to 1000 nm.

In the watch component of the present disclosure, the dimensional difference may be from 10 nm to 500 nm.

In the watch component of the present disclosure, the thickness of the silicon layer in the first region may be from 50 nm to 80 nm, and the thickness of the silicon layer in the second region may be from 110 nm to 140 nm.

In the watch component of the present disclosure, the thickness of the silicon layer in the first region may be from 50 nm to 80 nm, and the thickness of the silicon layer in the second region may be from 80 nm to 110 nm.

In the watch component of the present disclosure, the thickness of the silicon layer in the first region may be from 80 nm to 110 nm, and the thickness of the silicon layer in the second region may be from 110 nm to 140 nm.

In the watch component of the present disclosure, a color of the first region may be different from a color of the second region.

The watch component of the present disclosure is at least one selected from the group consisting of a barrel complete, a wheel and pinion, an escape wheel and pinion, a pallet fork, and a balance with hairspring.

In the watch component of the present disclosure, the watch component is the escape wheel and pinion, and a rim portion of the escape wheel and pinion may include the first region and the second region, and at least a character or a mark may be displayed by one of the first region and the second region.

In the watch component of the present disclosure, the light reflecting layer may further include a third region, and the thickness of the silicon layer in the first region, the thickness of the silicon layer in the second region, and a thickness of the silicon layer in the third region may be different from one another.

A watch movement of the present disclosure includes the above-described watch component.

A watch of the present disclosure includes the watch component.

The watch of the present disclosure may be a mechanical watch having see-through structure.

DESCRIPTION OF EXEMPLARY EMBODIMENTS

Watch Component

A watch component is a concept that includes, in addition to a watch outer packaging component exposed to an exterior of a watch and used, a watch inner packaging component, and a screw for securing a watch component part.

Examples of the watch outer packaging component include, for example, a watch case, a watch band, a dial, a watch needle, a bezel, a crown, a button, a cover glass, a dial ring, a parting plate, a packing, and the like. Examples of the watch case include, for example, a case body, a case back, a one-piece case in which a case body and a case back are integrated, and the like. The watch band includes a band clasp, components used for attaching and detaching a band, and components used for attaching and detaching a bangle. Examples of the bezel include, for example, a rotary bezel, and the like. Examples of the crown include, for example, a screw-lock type crown, and the like.

Examples of the watch inner packaging component include, for example, a barrel complete, a wheel and pinion, an escape wheel and pinion, a pallet fork, a balance with hairspring, a mainspring, and the like.

Among others, from a perspective of more expressing decorativeness, the watch component may be a watch inner packaging component, and may be at least one type selected from the group consisting of a barrel complete, a wheel and pinion, an escape wheel and pinion, a pallet fork, and a balance with hairspring.

That is, the watch component may be mounted in a watch having see-through structure through which a mechanism inside the watch is visible, from the perspective of more expressing decorativeness.

First Exemplary Embodiment

A first exemplary embodiment of the present disclosure will be described below with reference to the accompanying drawings.

In the first exemplary embodiment, as a watch component, an escape gear portion constituting an escape wheel and pinion will be described as an example. Additionally, as a watch mounted with the escape gear portion, a mechanical watch will be described as an example.

Figure 1:
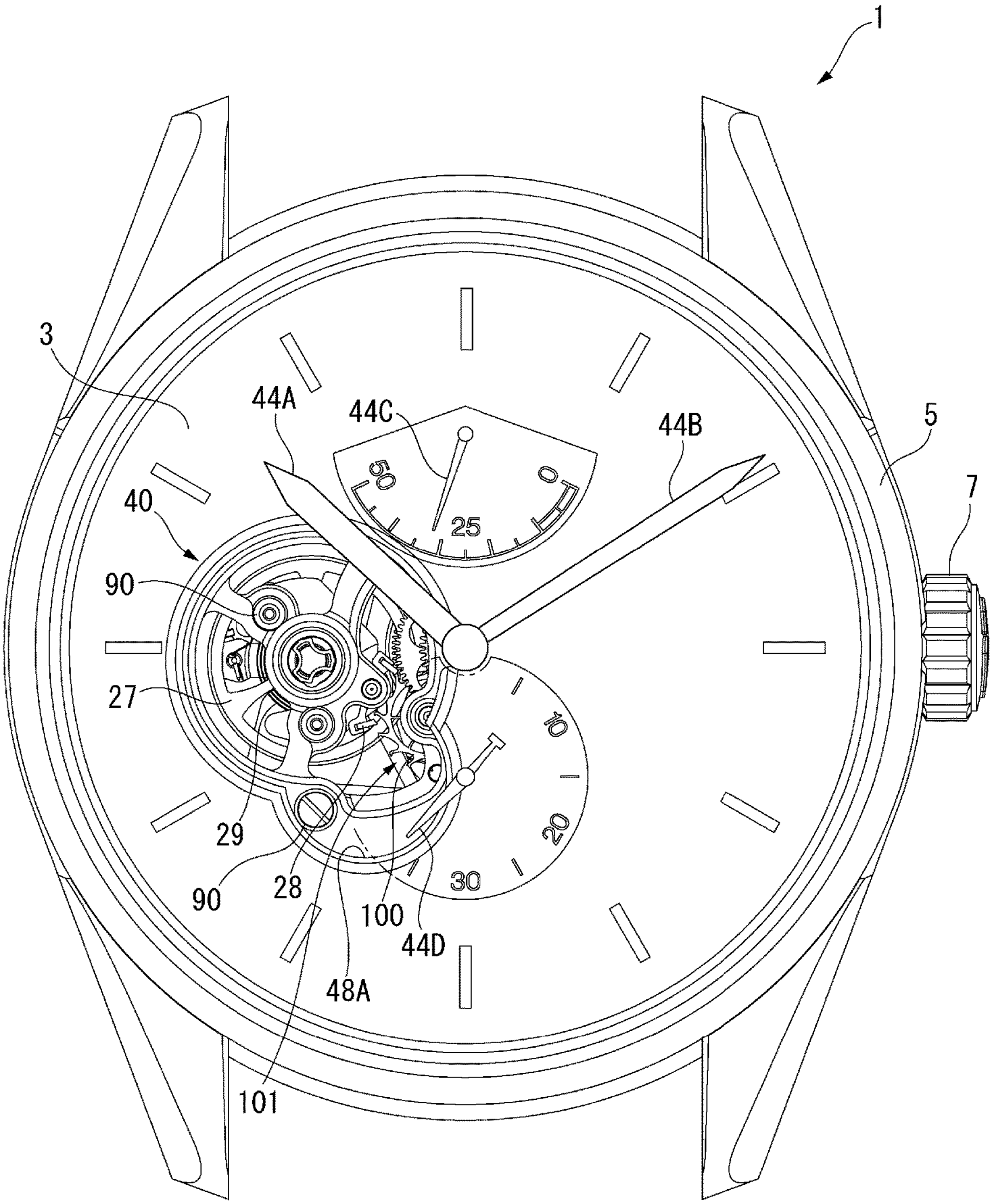
FIG. 1 is a plan view of a mechanical watch according to a first exemplary embodiment, viewed from a side of a dial.
Figure 2:
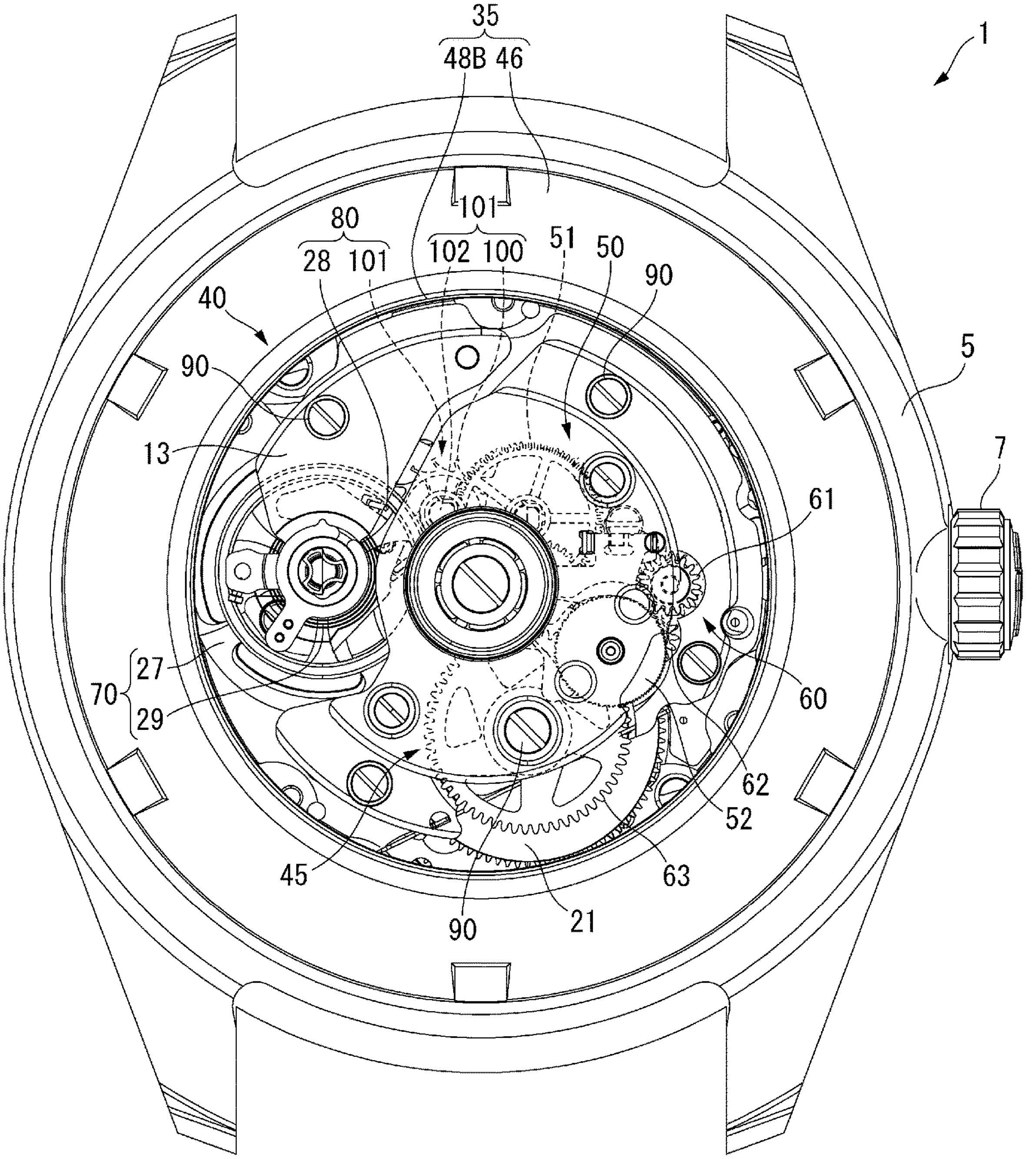
FIG. 2 is a plan view of the mechanical watch according to the first exemplary embodiment, viewed from a side of a case back.

FIG. 1 is a plan view of a mechanical watch 1 according to the first exemplary embodiment, viewed from a side of a dial. FIG. 2 is a plan view of the mechanical watch 1 according to the first exemplary embodiment, viewed from a side of a case back. Note that, among screws 90 for securing a component part of the watch, only some are assigned reference signs.

The mechanical watch 1 has see-through structure with which a part of a movement 40 is visible from a side of a dial and a side of a case back.

A plan view of the mechanical watch 1 viewed from the side of the dial will be described with reference to FIGS. 1 and 2.

The mechanical watch 1 is provided with a cylindrical outer packaging case 5, and a disk-shaped dial 3 is disposed on an inner circumferential side of the outer packaging case 5. The dial 3 is provided with a window 48A. The mechanical watch 1 is configured such that a part of the movement 40 is visible through the window 48A.

Of two openings in the outer packaging case 5, an opening on a front surface side is covered with a cover glass, and a case back 35 is attached to an opening on a rear surface side.

The mechanical watch 1 is provided with the movement 40 housed within the outer packaging case 5, an hour hand 44A for indicating time information, a minute hand 44B, a power reserve hand 44C for indicating duration according to a mainspring, and a small second 44D.

The hour hand 44A, the minute hand 44B, the power reserve hand 44C, and the small second 44D are attached to a guidance shaft of the movement 40, and driven by the movement 40.

A crown 7 is provided on a side surface of the outer packaging case 5. By operating the crown 7, it is possible to perform an input in accordance with an operation.

In FIG. 1, from the side of the dial, through the window 48A provided in the dial 3, an escape wheel and pinion 101, a pallet fork 28, a balance wheel 27, a hairspring 29, and the like that constitute a part of the movement 40 are visible. The escape wheel and pinion 101 includes an escape gear portion 100, and a shaft member 102, as the watch components according to the first exemplary embodiment.

A plan view of the mechanical watch 1 viewed from the side of the case back will be described with reference to FIGS. 1 and 2.

The case back 35 is constituted by a ring-shaped frame material 46 forming an outer peripheral portion, and a window 48B formed of a transparent member fitted into the frame material 46.

The movement 40 includes a train wheel 45, a balance bridge 13, a manual winding mechanism 60, an automated winding mechanism 50, and the like.

The train wheel 45 includes a barrel complete 21, a center wheel and pinion, a third wheel and pinion, a fourth wheel and pinion 51, the escape wheel and pinion 101, the pallet fork 28, and the balance wheel 27, provided on the side of the case back of a main plate. In FIG. 2, the barrel complete 21, the fourth wheel and pinion 51, the escape wheel and pinion 101, the pallet fork 28, and the balance wheel 27 are illustrated. The escape wheel and pinion 101 and the pallet fork 28 constitute an escapement 80, and the balance wheel 27 and the hairspring 29 constitute a speed regulator 70.

The manual winding mechanism 60 includes a winding stem, a winding pinion, a clutch wheel, a crown wheel 61, a square hole transmission wheel 62, a ratchet wheel 63, and the like. In FIG. 2, the crown wheel 61, the square hole transmission wheel 62, and the ratchet wheel 63 are illustrated.

The automatic winding mechanism 50 includes a rotating weight, a bearing, an eccentric wheel, a pawl lever, the transmission wheel 52, and the like. In FIG. 2, the transmission wheel 52 is illustrated.

In FIG. 2, from the side of the case back, through the window 48B provided in the case back 35, the barrel complete 21, the escape wheel and pinion 101, the pallet fork 28, the balance wheel 27, the crown wheel 61, the square hole transmission wheel 62, the ratchet wheel 63, the eccentric wheel, the transmission wheel 52, and the like that constitute a part of the movement 40 are visible.

In the mechanical watch 1, an aspect in which a component part of the movement 40 is visible from the side of the dial or the side of the case back is not limited to the above aspect.

For example, design, a size, an arrangement position, and the like of each of the windows 48A and 48B, and the number of windows may be changed as appropriate to make a desired component part of the movement 40 visible.

In addition, an entirety of the dial 3 may be formed from a transparent member, to make an entirety of the movement 40 visible from the side of the dial, or an entirety of the case back 35 may be formed from a transparent member, to make an entirety of the movement 40 visible from the side of the case back.

A configuration of the escape gear portion 100 as the watch component will be described in detail.

Figure 3:
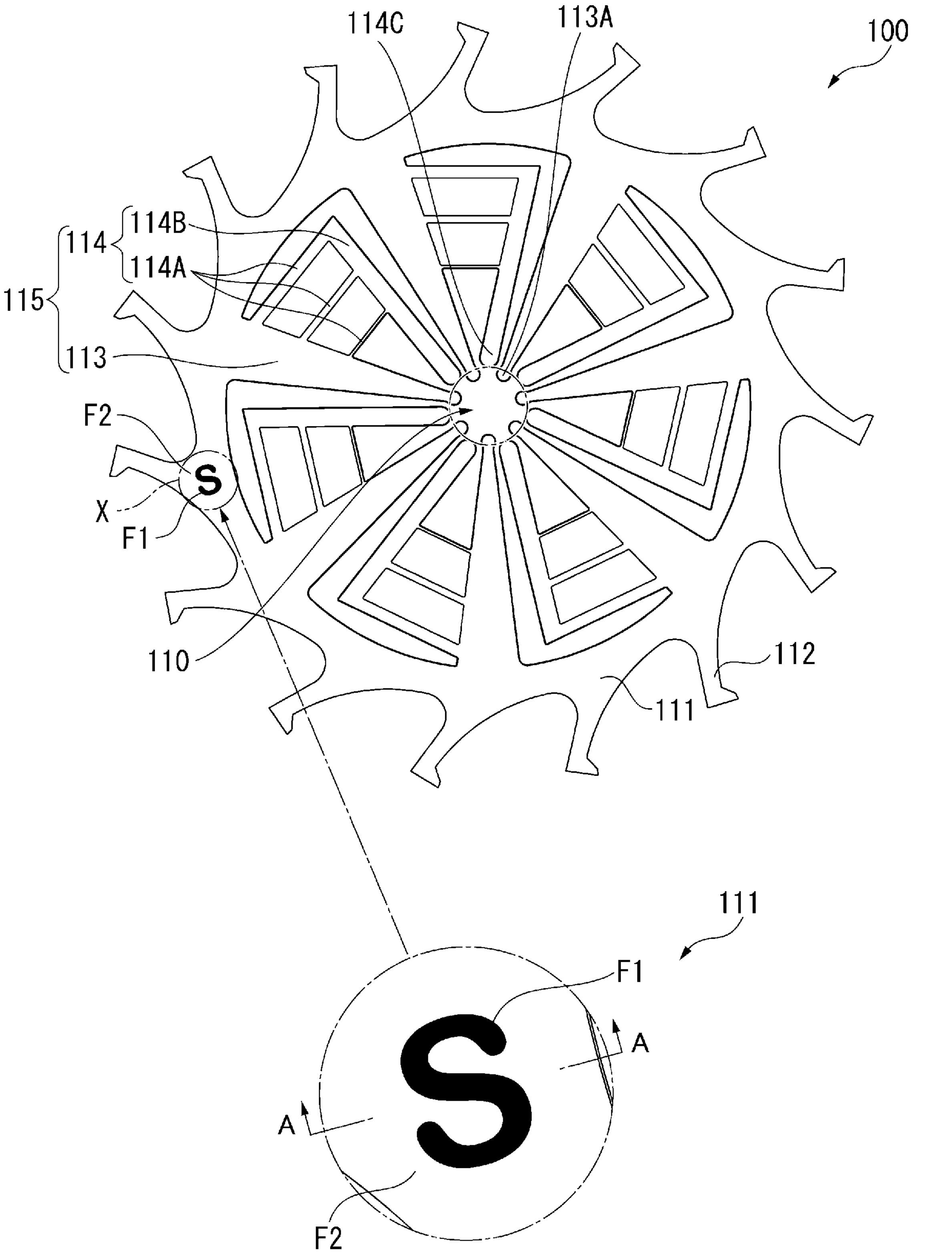
FIG. 3 includes a plan view of an escape gear portion according to the first exemplary embodiment and a partially enlarged view of an X region.

FIG. 3 includes a plan view of the escape gear portion 100, and a partial enlarged view of an X region.

The escape gear portion 100 has an insertion portion 110 in which a shaft member 102 is inserted through a center portion.

The escape gear portion 100 has a rim portion 111 having a plurality of teeth 112, and a holding unit 115 that holds the shaft member 102. The rim portion 111 is an annular portion of an outer edge of the escape gear portion 100. The tooth 112 is protrudingly provided outward from an outer periphery of the rim portion 111, and is formed in a special hook shape.

The escape gear portion 100 includes seven number of the holding units 115. The holding units 115 are disposed at an equal pitch of 360°/7 at respective seven locations in a circumferential direction of the annular rim portion 111. Note that, the number of holding units 115 may be in a range of three to seven, or may be equal to or greater than seven, and is not particularly limited.

The holding unit 115 includes a first holding unit 113 extending from the rim portion 111, and a second holding unit 114 provided and branched from the first holding unit 113. The first holding unit 113, the second holding unit 114, and the rim portion 111 are integrally formed of an identical material.

The first holding unit 113 extends in a direction from the rim portion 111 toward the shaft member 102, and is formed such that a width dimension decreases while proceeding toward the shaft member 102. A tip of the first holding unit 113 on a side of the shaft member 102 is an abutment portion 113A that abuts on the shaft member 102. The abutment portion 113A is formed in a planar arc shape.

The second holding unit 114 includes a first portion 114A and a second portion 114B. The second holding unit 114 has a function of fixing the shaft member 102 to a center of the escape gear portion 100, and suppressing tilting or dropping out of the escape gear portion 100 with respect to the shaft member 102.

The first portion 114A is coupled to the first holding unit 113, and is formed and branched from the first holding unit 113, and extends in a direction intersecting an extension direction of the first holding unit 113. The second holding unit 114 has a plurality of the first portions 114A. The plurality of first portions 114A are disposed substantially parallel to each other. The second portion 114B is coupled to the plurality of first portions 114A, and extends in a direction toward the shaft member 102. A width dimension of the second portion 114B is substantially constant, and a tip on a side of the shaft member 102 is an abutment portion 114C that abuts on the shaft member 102. The abutment portion 114C is formed in a planar arc shape.

In the present exemplary embodiment, a character of "S" is displayed on the rim portion 111 of the escape gear portion 100 so as to be identifiable. As illustrated in FIG. 3, the rim portion 111 of the escape gear portion 100 has a first region F1 and a second region F2. The first region F1 is a region in which the characters of "S" is displayed, and the second region F2 is a region in which the character of "S" is not displayed.

The first region F1 and the second region F2 develop respective colors different from each other.

Figure 4:
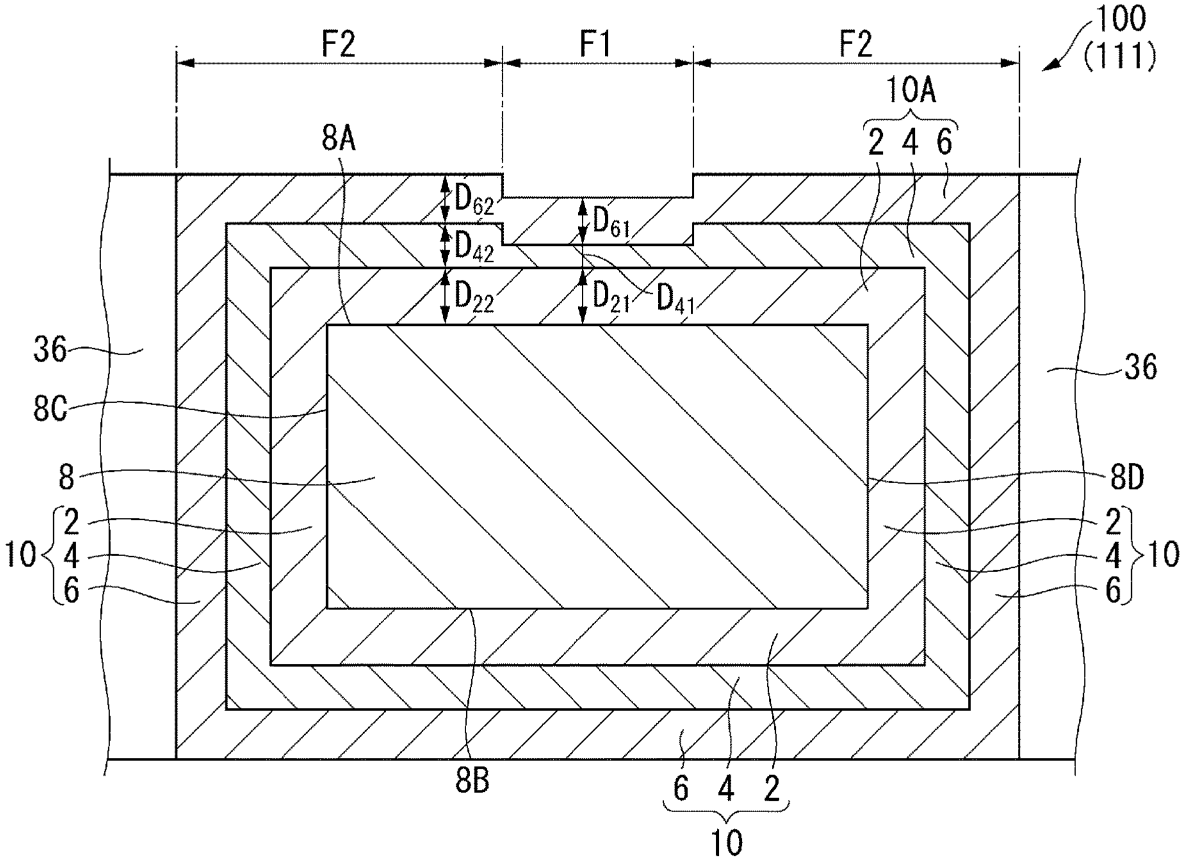
FIG. 4 is a partial cross-sectional view taken along a line A-A of the X region illustrated in FIG. 3.

Cross-sectional structure of the rim portion 111 of the escape gear portion 100 will be described. FIG. 4 is a partial cross-sectional view taken along a line A-A of the X region illustrated in FIG. 3.

The escape gear portion 100 has a substrate 8 containing silicon as a main component. The substrate 8 has a first surface 8A, a second surface 8B on an opposite side of the first surface 8A, and a third surface 8C and a fourth surface 8D coupling the first surface 8A and the second surface 8B.

In the present specification, the first surface 8A of the substrate 8 means, when a watch component is mounted in the watch, a surface on a side on which the watch component is visible.

When the watch component is mounted in the watch, and the watch component is visible from the side of the case back of the watch, the first surface 8A of the substrate 8 means a surface located on the side of the case back of the watch. However, when the watch component is visible from both the side of the dial and the side of the case back, the first surface 8A of the substrate 8 is defined as a surface located on the side of the dial of the watch.

In the case of the present exemplary embodiment, the escape gear portion 100 as the watch component is visible from both the side of the dial and the side of the case back of the mechanical watch 1, thus the first surface 8A of the substrate 8 is the surface located on the side of the dial, and the second surface 8B of the substrate 8 is the surface located on the side of the case back.

In the present specification, the substrate 8 means a watch component in a state in which light reflecting layers 10 and 10A are not formed. In the case of the present exemplary embodiment, the substrate 8 means an escape gear portion in a state in which the light reflecting layers 10 and 10A are not formed.

In the present specification, "containing silicon as a main component" means that mass content of silicon relative to an entire substrate is equal to or greater than 80% by mass. The content of silicon may be equal to or greater than 90% by mass, and may be equal to or greater than 95% by mass.

In the following description, the substrate 8 containing silicon as a main component is referred to as the substrate 8 made of silicon or simply the substrate 8 in some cases.

First, a configuration on a side of the first surface 8A of the substrate 8 will be described.

As illustrated in FIG. 4, a light reflecting layer 10A having a first silicon oxide layer 2, a silicon layer 4, and a second silicon oxide layer 6 in this order is provided on the first surface 8A of the substrate 8.

When the light reflecting layer 10A is viewed in plan view from the side of the first surface 8A of the substrate 8, the light reflecting layer 10A includes the first region F1 and the second region F2. The first region F1 corresponds to the region illustrated in FIG. 3 in which the character of "S" is displayed, and the second region F2 corresponds to the region illustrated in FIG. 3 in which the character of "S" is not displayed.

A thickness $D_{41}$ of the silicon layer 4 in the first region F1, and a thickness $D_{42}$ of the silicon layer 4 in the second region F2 are different from each other. In the present exemplary embodiment, the thickness $D_{42}$ of the silicon layer 4 in the second region F2 is set to be greater than the thickness $D_{41}$ of the silicon layer 4 in the first region F1.

A thickness $D_{21}$ of the first silicon oxide layer 2 in the first region F1, and a thickness $D_{22}$ of the first silicon oxide layer 2 in the second region F2 are an identical dimension.

A thickness $D_{61}$ of the second silicon oxide layer 6 in the first region F1, and a thickness $D_{62}$ of the second silicon oxide layer 6 in the second region F2 are an identical dimension.

In this way, the first silicon oxide layer 2, the silicon layer 4, and the second silicon oxide layer 6 are stacked in this order, such that only the thickness $D_{41}$ of the silicon layer 4 in the first region F1 and the thickness $D_{42}$ of the silicon layer 4 in the second region F2 are different from each other, in the light reflecting layer 10A on the first surface 8A of the substrate 8.

Next, a configuration on respective sides of the second surface 8B, the third surface 8C, and the fourth surface 8D of the substrate 8 will be described. In the present exemplary embodiment, the thickness of the silicon layer 4 on the second surface 8B, the third surface 8C, and the fourth surface 8D of the substrate 8 is an identical dimension to the thickness $D_{42}$ of the silicon layer 4 in the second region F2 of the first surface 8A of the substrate 8.

The thickness of the first silicon oxide layer 2 on the second surface 8B, the third surface 8C, and the fourth surface 8D of the substrate 8 is an identical dimension to the respective thicknesses $D_{21}$ and $D_{22}$ of the first silicon oxide layer 2 in the first region F1 and the second region F2 of the first surface 8A of the substrate 8.

The thickness of the second silicon oxide layer 6 on the second surface 8B, the third surface 8C, and the fourth surface 8D of the substrate 8 is an identical dimension to the respective thicknesses $D_{61}$ and $D_{62}$ of the second silicon oxide layer 6 in the first region F1 and the second region F2 of the first surface 8A of the substrate 8.

Substrate

The substrate 8 contains silicon as a main component. A type of silicon is not particularly limited, and an appropriate type can be selected from a perspective of workability. Examples of silicon include monocrystalline silicon, polycrystalline silicon, and the like. From among these types, a single type may be used alone, or two or more types may be used in combination.

The substrate 8 made of silicon can be manufactured by, for example, a photolithography technique and an etching technique, and thus a complex shape can be formed.

Light Reflecting Layer

The light reflecting layers 10 and 10A each have the first silicon oxide layer 2, the silicon layer 4, and the second silicon oxide layer 6 in this order on the substrate 8. In the present exemplary embodiment, the light reflecting layer is provided on the first surface 8A, the second surface 8B, the third surface 8C, and the fourth surface 8D of the substrate 8, and has three-layer structure. The light reflecting layer may have, for example, five-layer structure, but may have the three-layer structure, from a perspective of facilitating color adjustment.

The light reflecting layers 10 and 10A each have a function of freely adjusting light transmission and reflection by at least one of the surfaces among a front surface of the second silicon oxide layer 6 on an opposite side to the silicon layer 4, an interface between the second silicon oxide layer 6 and the silicon layer 4, an interface between the silicon layer 4 and the first silicon oxide layer 2, and a front surface of the substrate 8.

As illustrated in FIG. 4, an outermost layer of each of the light reflecting layers 10 and 10A is the second silicon oxide layer 6. Accordingly, protection of the escape gear portion 100 is enhanced.

First Silicon Oxide Layer

The first silicon oxide layer 2 is provided on the substrate 8. In the present exemplary embodiment, the first silicon oxide layer 2 is provided on the first surface 8A, the second surface 8B, the third surface 8C, and the fourth surface 8D of the substrate 8.

The thickness of the first silicon oxide layer 2 is adjusted in accordance with a color to develop, but normally may be from 100 nm to 450 nm, and may be from 100 nm to 400 nm. When the thickness of the first silicon oxide layer 2 is equal to or greater than 100 nm, the thickness is easily controlled. When the thickness of the first silicon oxide layer 2 is equal to or less than 400 nm, film formation time can be shortened, so productivity is improved.

For example, when the first region F1 of the escape gear portion 100 is made to develop blue, the thickness $D_{21}$ of the first silicon oxide layer 2 in the first region F1 may be from 20 nm to 100 nm, or from 180 nm to 290 nm, or equal to or greater than 330 nm, and may be from 210 nm to 280 nm. Note that, an upper limit may be equal to or less than 450 nm from a perspective of productivity. A suitable range of the thickness $D_{21}$ of the first silicon oxide layer 2 can be calculated, for example, by known optical calculation.

When the second region F2 of the escape gear portion 100 is made to develop blue, the thickness $D_{22}$ of the first silicon oxide layer 2 in the second region F2 may be in a similar range to that of the thickness $D_{21}$ of the first silicon oxide layer 2 in the first region F1.

The first silicon oxide layer 2 may be a thermal silicon oxide layer formed by a thermal oxidation method. Formation of a thermal silicon oxide layer using the thermal oxidation method makes it easier to obtain a silicon layer with high uniformity.

Silicon Layer

The silicon layer 4 is provided on the first silicon oxide layer 2. In the present exemplary embodiment, the silicon layer 4 is provided on an entire surface of the first silicon oxide layer 2.

The silicon layer 4 may be an amorphous layer or a polysilicon layer, but may be a polysilicon layer.

In the escape gear portion 100 of the present exemplary embodiment, a dimensional difference between the thickness $D_{41}$ of the silicon layer 4 in the first region F1, and the thickness $D_{42}$ of the silicon layer 4 in the second region F2 may be from 5 nm to 500 nm, may be from 10 nm to 500 nm, and may be from 15 nm to 500 nm.

When the dimensional difference between the thickness $D_{41}$ of the silicon layer 4 in the first region F1 and the thickness $D_{42}$ of the silicon layer 4 in the second region F2 is from 5 nm to 500 nm, respective colors developed from the first region F1 and the second region F2 are easily identified.

The thickness $D_{41}$ of the silicon layer 4 in the first region F1 may be from 50 nm to 110 nm.

The thickness $D_{42}$ of the silicon layer 4 in the second region F2 may be from 80 nm to 140 nm.

A suitable range of the thickness of the silicon layer 4 can be calculated, for example, by known optical calculation.

In the escape gear portion 100 of the present exemplary embodiment, the first region F1 and the second region F2 may be provided on the rim portion 111 of the escape gear portion 100.

Second Silicon Oxide Layer

The second silicon oxide layer 6 is provided on the silicon layer 4. In the present exemplary embodiment, the second silicon oxide layer 6 is provided on an entire surface of the silicon layer 4.

The thickness of the second silicon oxide layer 6 is adjusted in accordance with a color to develop, but normally may be from 5 nm to 500 nm, and may be from 10 nm to 500 nm.

For example, when the first region F1 of the escape gear portion 100 is made to develop blue, the thickness $D_{61}$ of the second silicon oxide layer 6 in the first region F1 may be from 100 nm to 200 nm, or from 250 nm to 360 nm, or equal to or greater than 400 nm. Furthermore, from a perspective of suppressing a difference in color development due to a viewing angle, the thickness $D_{61}$ of the second silicon oxide layer 6 in the first region F1 may be from 130 nm to 200 nm, or from 310 nm to 360 nm. Note that, an upper limit may be equal to or less than 500 nm from the perspective of productivity. A suitable range for the thickness of the second silicon oxide layer 6 can be calculated, for example, by optical calculation.

When the second region F2 of the escape gear portion 100 is made to develop blue, the thickness $D_{62}$ of the second silicon oxide layer 6 in the second region F2 may be in a similar range to that of the thickness $D_{61}$ of the second silicon oxide layer 6 in the first region F1.

The second silicon oxide layer 6 may be a thermal silicon oxide layer formed by a thermal oxidation method. Since a thermal silicon oxide layer typically has an excellent mechanical characteristic, compared to a silicon oxide layer formed by a vapor deposition method, protection of the substrate 8 is further enhanced by making the second silicon oxide layer 6 as a thermal silicon oxide layer. In particular, in gears such as the escape gear portion 100 having a contact site with other component, mechanical strength of the contact site is enhanced, which is desirable.

The thickness of the second silicon oxide layer 6 is adjusted depending on a color to develop, but may be less than the thickness of the first silicon oxide layer 2.

In the thermal oxidation method, for example, the silicon layer 4 formed in advance of formation of the second silicon oxide layer 6 is oxidized to form the second silicon oxide layer 6. In this case, since the silicon layer 4 is formed of an amorphous layer or a polysilicon layer, it is difficult to control the thickness of the second silicon oxide layer 6. Typically, since it is easier to control a layer thickness when the layer thickness is small, a layer thickness of the second silicon oxide layer 6 may be small. Accordingly, the thickness of the second silicon oxide layer 6 may be less than the thickness of the first silicon oxide layer 2.

In the present exemplary embodiment, the respective thicknesses $D_{21}$ and $D_{22}$ of the first silicon oxide layer 2 in the first region F1 and the second region F2, the thicknesses an and $D_{42}$ of the silicon layer 4, the thicknesses $D_{61}$ and $D_{62}$ of the second silicon oxide layer 6, and the respective thicknesses of the light reflecting layers 10 and 10A each mean an average thickness.

Note that, similarly in exemplary embodiments described below, a thickness $D_{23}$ of the first silicon oxide layer 2, a thickness $D_{43}$ of the silicon layer 4, a thickness $D_{63}$ of the second silicon oxide layer 6 in a third region F3, and respective thicknesses of the light reflecting layers 10B and 10C each mean an average thickness.

The average thickness of each the layer can be measured by the following method.

A part of the escape gear portion 100 as the watch component is cut out and used as a test piece. A cross-section of the test piece is observed using an SEM (scanning electron microscope), a thickness of a layer to be measured is measured at any ten points, and an average value thereof is used as a "thickness of the layer to be measured".

The layer to be measured is any one layer of the first silicon oxide layer 2, the silicon layer 4, the second silicon oxide layer 6, and the light reflecting layers 10 and 10A, or the light reflecting layers 10B and 10C described below.

Characteristics of Watch Component

Hue

In the escape gear portion 100 of the present exemplary embodiment, the color of the first region F1 and the color of the second region F2 may be different from each other.

In the present specification, "the color of the first region F1 and the color of the second region F2 are different from each other" means that there is a difference in at least one of hue and chroma defined in a CIELAB color space. Note that, the hue and the chroma are expressed by color coordinates a*, in the CIELAB color space.

Hue Angle ∠h°

In a hue angle ∠h° defined in the CIELAB color space, a difference between a hue angle $\angle h_1°$ of the first region F1 and a hue angle $\angle h_2°$ of the second region F2 may be from 5° to 180°.

When the difference between the hue angle $\angle h_1°$ of the first region F1 and the hue angle $\angle h_2°$ of the second region F2 is from 5° to 180°, the color developed from each the region is more easily identified, thus decorativeness of the escape gear portion 100 can be further improved.

Note that, when the difference between the hue angle $\angle h_1°$ of the first region F1 and the hue angle $\angle h_2°$ of the second region F2 is equal to or greater than 0° and less than 5°, from a perspective of facilitating identification of the color developed from each the region, a distance between coordinates $(a_1, b_1)$ of the first region F1 and coordinates $(a_2, b_2)$ of the second region F2 described later may be equal to or greater than 5, and may be equal to or greater than 20.

The hue angle ∠h°, as defined in the CIELAB color space, is a parameter representing a hue, calculated according to the following equation, using color coordinates a*, in an L*a*b* color space that is a color space recommended by the International Commission on Illumination (CIE) in 1976, and has perceptually almost uniform rate.

"hue angle $\angle h°=\tan-1(b^*/a^*)$" Equation:

In addition, this hue angle ∠h° is also a correlation amount of hue (see also 03087 of JISZ8113) calculated by equation (11) in "4.2 Amount related to each of lightness, chroma, and hue", in "3.6 CIELAB1976ab hue angle" of Japanese Industrial Standards JISZ8781-4: 2013 "Colorimetry—fourth part: CIE1976L*a*b* color space", and "CIE1976L*a*b*" and "CIELAB" are stated to be mutually rephraseable.

The hue angle $\angle h_1°$ as defined in the CIELAB color space of the first region F1, and the hue angle $\angle h_2°$ as defined in the CIELAB color space of the second region F2, defined in the present specification, for example, can be determined from measurement in "5. Spectrophotometric Colorimetry" of Japanese Industrial Standards JISZ8722: 2009 "Color Measurement Method—Reflected and Transmitted Object Color".

Coordinates on a-b Plane

In an a-b plane of the CIELAB color space, when coordinates of the first regions F1 that are denoted by color coordinates a*, are $(a_1, b_1)$, and coordinates of the second region F2 that are denoted by color coordinates a*, are $(a_2, b_2)$, a distance between the coordinates $(a_1, b_1)$ of the first region F1 and the coordinates $(a_2, b_2)$ of the second region F2 may be equal to or greater than 5, and may be equal to or greater than 20. An upper limit of the distance is not particularly limited.

When the distance between the coordinates is equal to or greater than 5, the color developed from each the region is easily identified, so the decorativeness of the escape gear portion 100 can be further improved.

Note that, the distance between the coordinates ($a_1$, $b_1$) of the first region F1 and the coordinates ($a_2$, $b_2$) of the second region F2 is calculated by $((a_1-a_2)^2+(b_1-b_2)^2)^{1/2}$.

Maximum Reflectance

In the escape gear portion 100, a desired color can be developed, by adjusting the thickness of each the layer of the light reflecting layers 10 and 10A. In the present exemplary embodiment, by providing the first region F1 in which the thickness of the silicon layer 4 is $D_{41}$ and the second region F2 in which the thickness of the silicon layer 4 is $D_{42}$, in the light reflecting layer 10A, different colors can be developed from the first regions F1 and the second regions F2, respectively.

A desired color is not particularly limited, but for example, blue, green, red, yellow, pink, blue-green, and other mixed colors can be developed.

In the first region F1 or the second region F2 of the escape gear portion 100 according to the first exemplary embodiment, maximum reflectance in a wavelength range from 400 nm to less than 780 nm, when light is incident at an incident angle of 0° toward the light reflecting layer 10A, may be equal to or greater than 50%, or may be equal to or greater than 60%, and may be equal to or greater than 70%. Note that, the incident angle 0° is an angle of incident light with respect to a normal direction of the light reflecting layer 10A.

The maximum reflectance of the escape gear portion 100 can be measured using a test piece under the following conditions. Depending on specification of a measurement device, as the test piece, the escape gear portion 100 itself may be used, or a part cut out of the escape gear portion 100 so as to have a measurable size may also be used.

Measurement Conditions

Device: Microspectrometer (available from Olympus Corporation, USPM-RU-W)

Measurement environment: 25° C.

Incident angle 0°

In the first region F1 or the second region F2, the maximum reflectance when the escape gear portion 100 develops blue may be equal to or greater than 50%, may be equal to or greater than 60%, and may be equal to or greater than 70%, in a wavelength range from 400 nm to 550 nm.

In the first region F1 or the second region F2, the maximum reflectance when the escape gear portion 100 develops red may be equal to or greater than 50%, may be equal to or greater than 60%, and may be equal to or greater than 70%, in a wavelength range from 600 nm to 800 nm.

In the first region F1 or the second region F2, the maximum reflectance when the escape gear portion 100 develops green may be equal to or greater than 50%, may be equal to or greater than 60%, and may be equal to or greater than 70%, in a wavelength range from 400 nm to 600 nm.

In the first region F1 or the second region F2, the escape gear portion 100 may develop a mixed color such as a blue-green color, a pink color, or the like.

Effects

The escape gear portion 100 of the first exemplary embodiment has the light reflecting layers 10 and 10A in which the three layers of the silicon oxide layer being a relative low refractive index layer and the silicon layers each being a relative high refractive index layer are alternately stacked, on the first surface 8A, the second surface 8B, the third surface 8C, and the fourth surface 8D of the substrate 8 made of silicon, thus has an excellent color developing characteristic.

Furthermore, the escape gear portion 100 of the first exemplary embodiment is configured such that the first region F1 and the second region F2 are provided in the light reflecting layer 10A, and the respective thicknesses of the silicon layer 4 in the first region F1 and the second region F2 are different from each other, among the layers constituting the light reflecting layer 10A.

Accordingly, different colors can be developed from the first region F1 and the second region F2, respectively, and each the color can be favorably developed. Thus, according to the first exemplary embodiment, the escape gear portion 100 having excellent decorativeness is realized.

Here, the meaning that the silicon layer 4 is made to have different thicknesses among the layers constituting the light reflecting layer 10A will be described.

Figure 5:
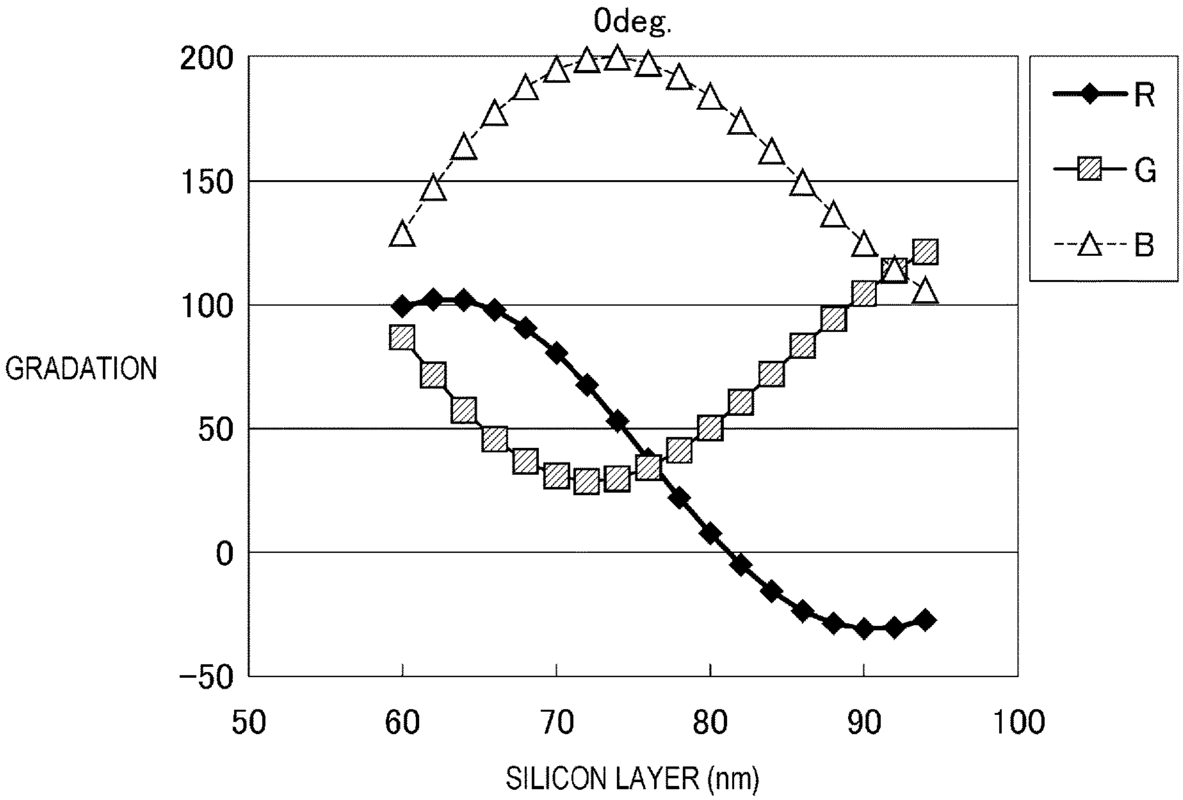
FIG. 5 is a graph illustrating a relationship between thickness of a silicon layer and gradation in a laminate S including a silicon substrate, a first silicon oxide layer, a silicon layer, and a second silicon oxide layer.

FIG. 5 is a graph illustrating a relationship between thickness of a silicon layer and gradation in the laminate S including a silicon substrate, a first silicon oxide layer, a silicon layer, and a second silicon oxide layer. A viewing angle is 0°.

A configuration of the laminate S is schematically illustrated as follows.

Silicon substrate/first silicon oxide layer (220 nm)/silicon layer (from 60 nm to 94 nm changed in step of 2 nm)/second silicon oxide layer (140 nm)

The gradation of the laminate S was determined by the following method. By using a refractive index n and an extinction coefficient k of each of the silicon substrate, the first silicon oxide layer, the silicon layer, and the second silicon oxide layer, with respect to a wavelength range from 400 nm to 800 nm, and according to optical calculation, a reflectance spectrum was determined. Next, reflectance R (A) and a color-matching function were converted to tristimulus values XYZ by a known method, and then converted to 256 gradation RGB values. Note that, y=1 without y correction.

As illustrated in FIG. 5, it can be seen that, in the laminate S, by simply changing the thickness of the silicon layer by approximately 5 nm, the gradation of each of blue (B), red (R), and green (G) changes greatly, and by changing the thickness by approximately 10 nm, the gradation changes further greatly.

The above change in gradation is greater than a change in gradation when the thickness of the first silicon oxide layer is changed, and is greater than a change in gradation when the thickness of the second silicon oxide layer is changed.

The present inventors focused on this change in gradation due to the thickness of the silicon layer, and discovered that decorativeness of the watch component is improved by changing the thickness of the silicon layer, among the layers that constitute the light reflecting layer.

According to the first exemplary embodiment, a wide variety of colors can be developed from the first region F1 and the second region F2.

Additionally, in the escape gear portion 100, since the substrate 8 is made of silicon, and each of the light reflecting layers 10 and 10A is formed of a material containing silicon, it is conceivable that adhesion between the substrate 8 and the first silicon oxide layer 2, between the first silicon oxide layer 2 and the silicon layer 4, and between the silicon layer 4 and the second silicon oxide layer 6 is favorable. In other words, it is conceivable that adhesion between the substrate 8 and each of the light reflecting layers 10 and 10A is favorable. As a result, there is no need for a normally provided adhesive layer between the substrate 8 and each of the light reflecting layers 10 and 10A, and a configuration is obtained in which durability as a whole is improved.

Furthermore, the second silicon oxide layer 6, that is the silicon oxide layer, is disposed as the outermost layer of the escape gear portion 100, and thus structure is obtained in which protection of the substrate 8 is enhanced. It is conceivable that the second silicon oxide layer 6 that is physically and chemically stable can also serve as a protective material for the substrate 8.

As described above, the escape gear portion 100, in which all of the substrate 8 and the light reflecting layers 10 and 10A include silicon, and that can develop the different colors from the first region F1 and the second region F2 respectively, has an unprecedented configuration.

In addition, when a light reflecting layer having three-layer structure is formed at one surface of a substrate, normally, stress of stacked layers is often problematic. Since an order of a thickness of the substrate is 100 μm, in a gear such as an escape gear portion, for example, when a light reflecting layer is formed at only one surface of the gear, the gear may be distorted by stress of the light reflecting layer.

Compared to this, in the escape gear portion 100 of the first exemplary embodiment, since the light reflecting layers 10 and 10A each having the three-layer structure are provided on the first surface 8A, the second surface 8B, the third surface 8C, and the fourth surface 8D, distortion of the substrate 8 due to layer stress of the light reflecting layers 10 and 10A is suppressed. Furthermore, the second silicon oxide layer 6 provided as the outermost layer enhances protection of the first surface 8A, the second surface 8B, the third surface 8C, and the fourth surface 8D of the substrate 8. As a result, the escape gear portion 100 with excellent durability is realized.

Furthermore, when the escape gear portion 100 is mounted in the mechanical watch 1 having the see-through structure as illustrated in FIG. 1 and FIG. 2, the escape gear portion 100 is also visible from both the side of the dial and the side of the case back, thus decorativeness of the mechanical watch 1 can be further improved.

In addition, since the decorativeness of the escape gear portion 100 of the first exemplary embodiment can be improved without making concavity and convexity on the substrate 8, strength of the whole component can be maintained, as compared to the technique described in JP-A-2017-053853.

Method for Manufacturing Watch Component of First Exemplary Embodiment

FIG. 6A to FIG. 6C, FIG. 7A to 7C, and FIG. 8A to 8C are cross-sectional views for explaining a method for manufacturing the escape gear portion 100 according to the first exemplary embodiment.

The substrate 8 made of silicon is prepared. As the substrate 8, one that is manufactured may be used, or one that is procured may be used. The substrate 8 can be manufactured by, for example, a photolithography technique and an etching technique. By using the substrate 8 made of silicon, weight reduction of the escape gear portion 100 is realized, as compared to when a metal substrate is used. Additionally, complex shapes can be formed, by the photolithography technique and the etching technique.

Process for Forming First Silicon Oxide Layer

Figure 6A:
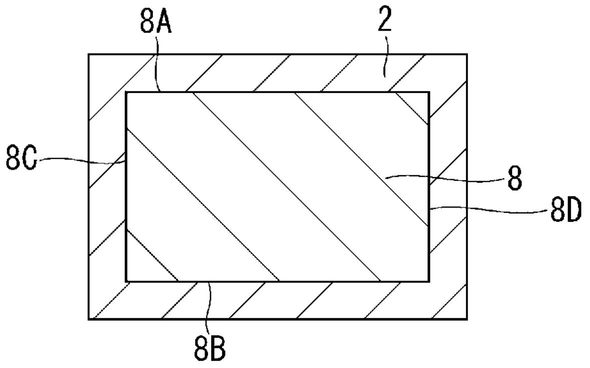
FIG. 6A to FIG. 6C are cross-sectional views each explaining a method for manufacturing the escape gear portion according to the first exemplary embodiment.

As illustrated in FIG. 6A, the first silicon oxide layer 2 is formed at the first surface 8A, the second surface 8B, the third surface 8C, and the fourth surface 8D of the substrate 8.

Examples of the method for forming the first silicon oxide layer 2 include, for example, a thermal oxidation method, a physical vapor deposition method (PVD method), a chemical vapor deposition method (CVD method), a method in which these methods are combined, and the like. Examples of the thermal oxidation method include, for example, a wet oxidation method using water, and a dry oxidation method using oxygen. Examples of the PVD method include, for example, a sputtering method, an ion plating method, a vacuum deposition method, and the like. Examples of the CVD method include, for example, a plasma chemical vapor deposition method, a thermal chemical vapor deposition method, a photochemical vapor deposition method, and the like.

As the method for forming the first silicon oxide layer 2, the thermal oxidation method using water or the dry oxidation method using oxygen may be used. When the first silicon oxide layer 2 is formed by the thermal oxidation method, a thermal oxidation oven that is a vertical oven or a horizontal oven may be used, from a perspective of productivity.

Forming conditions of the first silicon oxide layer 2 may be adjusted as appropriate in accordance with a shape of the substrate 8, an intended thickness, and the like.

Process for Forming Silicon Layer

Figure 6B:
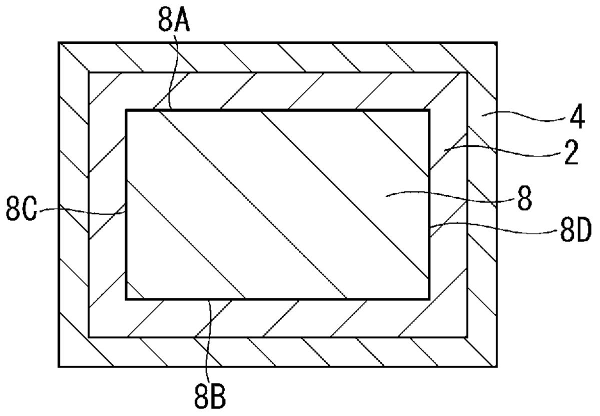

As illustrated in FIG. 6B, the silicon layer 4 is formed at an entire surface of the first silicon oxide layer 2.

Examples of the method for forming the silicon layer 4 include, for example, the PVD method, the CVD method, a method in which these methods are combined, and the like. Examples of the PVD method and the CVD method include methods similar to those illustrated in the process for forming the first silicon oxide layer 2. The silicon layer 4 may be formed by a low-pressure CVD method. For example, in the low-pressure CVD method, by controlling deposition temperature to be from 500° C. to 700° C., and by flowing monosilane gas under low pressure, the silicon layer 4 can be formed. When the silicon layer 4 is formed by the low-pressure CVD method, layer quality of the silicon layer 4 can be controlled from amorphous silicon to polysilicon, depending on the deposition temperature. When the silicon layer 4 is formed by the low-pressure CVD method, a low-pressure CVD oven that is a vertical oven or a horizontal oven may be used, from perspective of productivity.

Forming conditions of the silicon layer 4 may be adjusted as appropriate in accordance with the shape of the substrate 8, an intended thickness, and the like.

Process for Forming Resist Layer

Figure 6C:
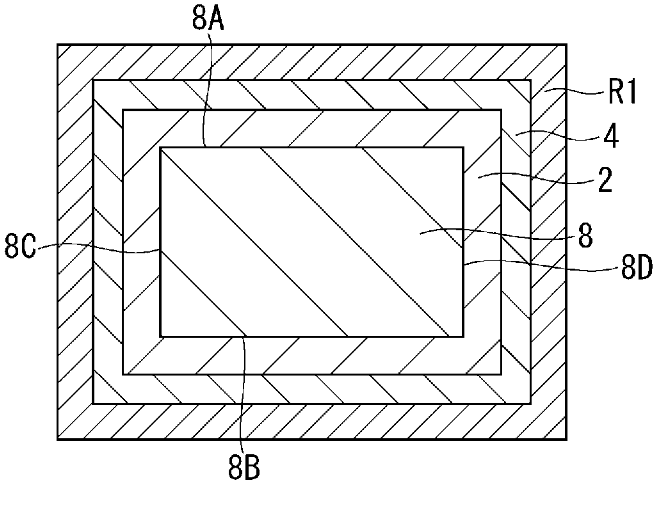

As illustrated in FIG. 6C, a resist layer R1 is formed, for example, by applying a known resist on an entire surface of the silicon layer 4. Note that, the resist layer R1 need not be formed at the entire surface of the silicon layer 4, when a side of each of the second surface 8B, the third surface 8C, and the fourth surface 8D of the substrate 8 is protected from etching. It is sufficient that the resist layer R1 is formed at least in a region where the first region F1 and the second region F2 are provided. In addition, the resist layer R1 illustrated in FIG. 6C is a positive type resist layer, but a negative resist layer may be used in accordance with a machining method.

Exposure Process

Figure 7A:
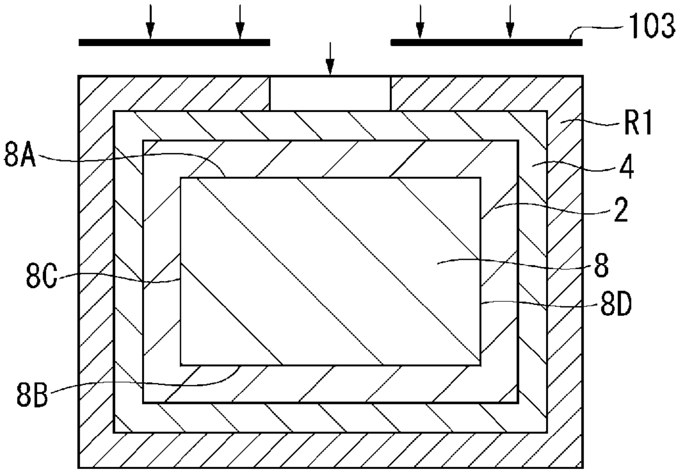
FIG. 7A to FIG. 7C are cross-sectional views each explaining the method for manufacturing the escape gear portion according to the first exemplary embodiment.

As illustrated in FIG. 7A, the resist layer R1 is irradiated with light via a mask 103, a pattern of the mask 103 is transferred, and the resist layer R1 is exposed.

Development Process

Figure 7B:
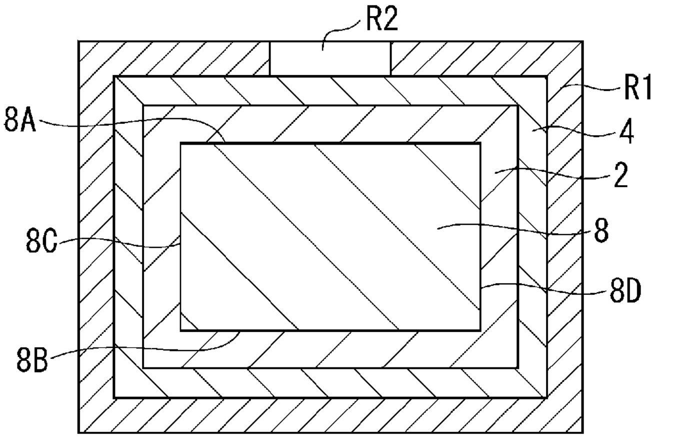
Figure 7C:
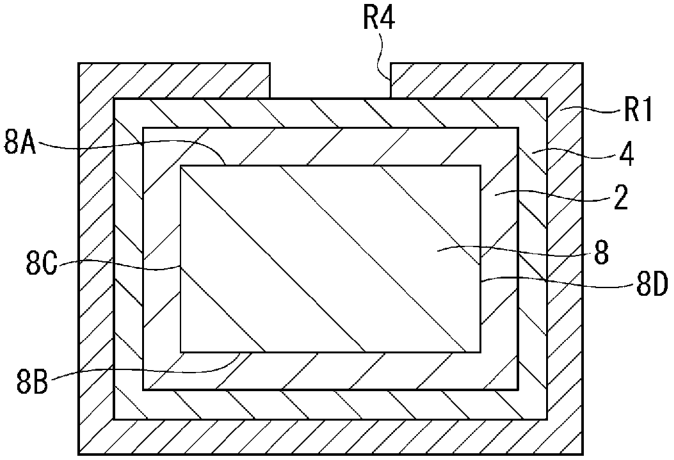

As illustrated in FIG. 7B and FIG. 7C, a resist layer R2 that is exposed is developed and removed, and an opening portion R4 is manufactured in the resist layer R1.

Etching Process

Figure 8A:
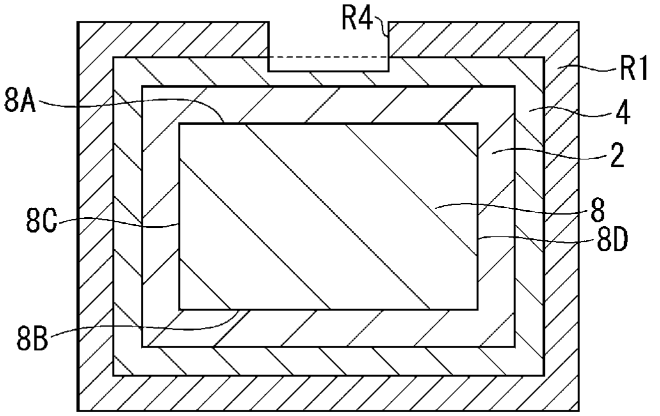
FIG. 8A to FIG. 8C are cross-sectional views each explaining the method for manufacturing the escape gear portion according to the first exemplary embodiment.

As illustrated in FIG. 8A, the resist layer R1 is used as a mask, and the silicon layer 4 exposed to the opening portion R4 is etched, until an intended thickness of the silicon layer 4 is reached. The etching may be dry etching or wet etching, but dry etching may be used from a viewpoint of workability.

Next, the resist layer R1 is removed.

Figure 8B:
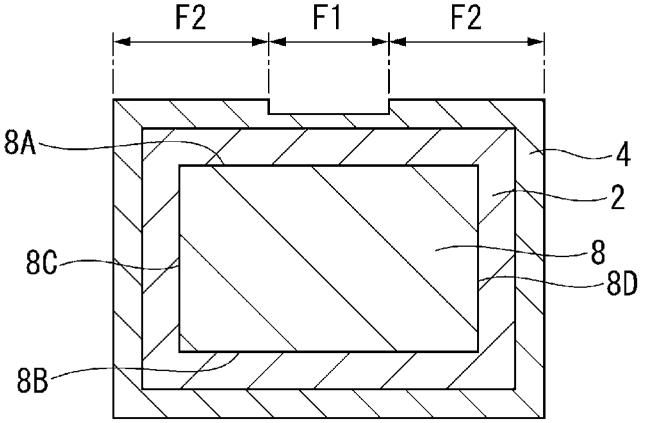

Accordingly, as illustrated in FIG. 8B, the silicon layer 4 is formed in which a thickness of the silicon layer in the first region F1 and a thickness of the silicon layer in the second region F2 are different from each other.

Process for Forming Second Silicon Oxide Layer

Figure 8C:
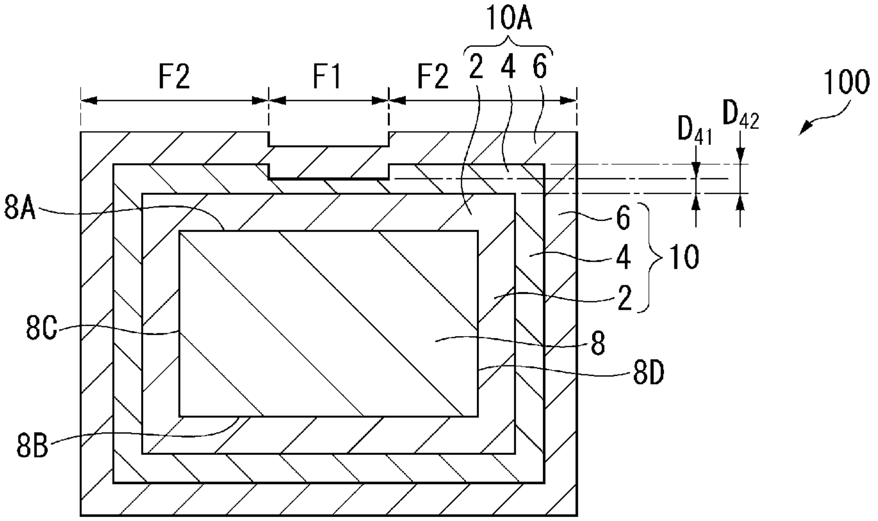

As illustrated in FIG. 8C, the second silicon oxide layer 6 is formed at the entire surface of the silicon layer 4.

The second silicon oxide layer 6 can be formed by a similar method to the method for forming the first silicon oxide layer 2. The second silicon oxide layer 6 may be formed by thermally oxidizing a part of the silicon layer 4. Accordingly, a function as a protective material of the second silicon oxide layer 6 is more exerted.

When the second silicon oxide layer 6 is formed by thermally oxidizing a part of the silicon layer 4, the part of the silicon layer 4 is consumed to form the second silicon oxide layer 6.

Forming conditions of the second silicon oxide layer 6 may be adjusted as appropriate in accordance with the shape of the substrate 8, an intended thickness, and the like.

According to the above process, the escape gear portion 100 is manufactured in which the light reflecting layer 10 is provided on the second surface 8B, the third surface 8C, and the fourth surface 8D of the substrate 8, and the light reflecting layer 10A is provided on the first surface 8A of the substrate 8 in which the thickness of the silicon layer 4 in the first region F1 is $D_{41}$, and the thickness of the silicon layer 4 in the second region F2 is $D_{42}$.

In the method for manufacturing of the first exemplary embodiment, at least one of the first silicon oxide layer 2 and the second silicon oxide layer 6 may be formed by the thermal oxidation method, and both the first silicon oxide layer 2 and the second silicon oxide layer 6 may be formed by thermal oxidation method.

Second Exemplary Embodiment

With respect to a second exemplary embodiment, differences from the first exemplary embodiment will be focused and explained, and descriptions on similar matters will be omitted.

An escape gear portion 200 according to the second exemplary embodiment, with respect to the escape gear portion 100 according to the first exemplary embodiment, is similar to the escape gear portion 100 according to the first embodiment, except that the first region F1 and the second region F2 of the X region illustrated in FIG. 3 are replaced with each other.

Cross-sectional structure of a rim portion 111B of the escape gear portion 200 will be described.

First, a configuration on a side of the first surface 8A of the substrate 8 will be described.

Figure 9:
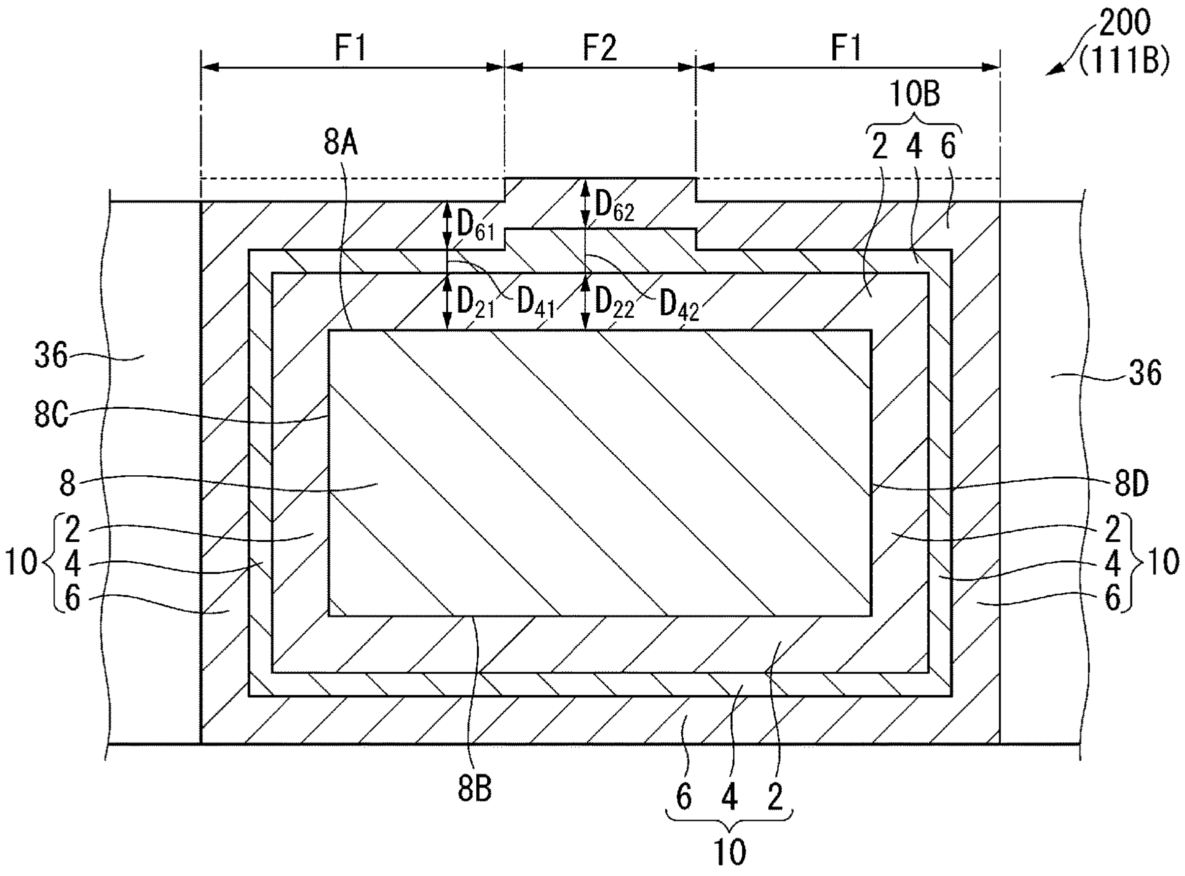
FIG. 9 is a partial cross-sectional view of an escape gear portion according to a second exemplary embodiment.

As illustrated in FIG. 9, a light reflecting layer 10B in which the first silicon oxide layer 2, the silicon layer 4, and the second silicon oxide layer 6 are stacked in this order, is provided on the first surface 8A of the substrate 8.

When the light reflecting layer 10B is viewed in plan view, from the side of the first surface 8A of the substrate 8, the light reflecting layer 10B includes the first region F1 and the second region F2. The first region F1 corresponds to the region illustrated in FIG. 3 in which the character of "S" is not displayed, and the second region F2 corresponds to the region illustrated in FIG. 3 in which the character of "S" is displayed.

The first region F1 and the second region F2 develop respective colors different from each other.

The thickness $D_{41}$ of the silicon layer 4 in the first region F1, and the thickness $D_{42}$ of the silicon layer 4 in the second region F2 are different from each other. In the present exemplary embodiment, the thickness $D_{42}$ of the silicon layer 4 in the second region F2 is set to be greater than the thickness $D_{41}$ of the silicon layer 4 in the first region F1.

The thickness $D_{21}$ of the first silicon oxide layer 2 in the first region F1, and the thickness $D_{22}$ of the first silicon oxide layer 2 in the second region F2 are an identical dimension.

The thickness $D_{61}$ of the second silicon oxide layer 6 in the first region F1, and the thickness $D_{62}$ of the second silicon oxide layer 6 in the second region F2 are an identical dimension.

In this way, the first silicon oxide layer 2, the silicon layer 4, and the second silicon oxide layer 6 are stacked in this order, such that only the thickness $D_{41}$ of the silicon layer 4 in the first region F1 and the thickness $D_{42}$ of the silicon layer 4 in the second region F2 are different from each other, in the light reflecting layer 10B on the first surface 8A of the substrate 8.

Next, a configuration on respective sides of the second surface 8B, the third surface 8C, and the fourth surface 8D of the substrate 8 will be described. In the present exemplary embodiment, the thickness of the silicon layer 4 on the second surface 8B, the third surface 8C, and the fourth surface 8D of the substrate 8 is an identical dimension to the thickness $D_{41}$ of the silicon layer 4 in the first region F1 of the first surface 8A of the substrate 8.

The thickness of the first silicon oxide layer 2 on the second surface 8B, the third surface 8C, and the fourth surface 8D of the substrate 8 is an identical dimension to the respective thicknesses $D_{21}$ and $D_{22}$ of the first silicon oxide layer 2 in the first region F1 and the second region F2 of the first surface 8A of the substrate 8.

The thickness of the second silicon oxide layer 6 on the second surface 8B, the third surface 8C, and the fourth surface 8D of the substrate 8 is an identical dimension to the respective thicknesses $D_{61}$ and $D_{62}$ of the second silicon oxide layer 6 in the first region F1 and the second region F2 of the first surface 8A of the substrate 8.

In the escape gear portion 200 of the present exemplary embodiment, the thickness an of the silicon layer 4 in the first region F1 may be from 50 nm to 80 than nm, and the thickness $D_{42}$ of the silicon layer 4 in the second region F2 may be from 110 nm to 140 nm.

When the respective thicknesses $D_{41}$ and $D_{42}$ of the silicon layer 4 in the first region F1 and the second region F2 are within the range described above, a color developed from each the region is easily identified. As a result, decorativeness of the escape gear portion 200 can be further improved.

In the case of this aspect, from a perspective of further improving the identifiability and decorativeness, the second F2 region may be a region for displaying a character, a mark, a pattern, or a combination thereof, and the first region F1 may be an entire region other than the second region F2.

In the escape gear portion 200 of the present exemplary embodiment, the thickness $D_{41}$ of the silicon layer 4 in the first region F1 may be from 50 nm to 80 than nm, and the thickness $D_{42}$ of the silicon layer 4 in the second region F2 may be from 80 nm to 110 nm.

When the respective thicknesses $D_{41}$ and $D_{42}$ of the silicon layer 4 in the first region F1 and the second region F2 are within the range described above, a color developed from each the region is easily identified. As a result, decorativeness of the escape gear portion 200 can be further improved.

In the case of this aspect, from a perspective of further improving the identifiability and decorativeness, the second F2 region may be a region for displaying a character, a mark, a pattern, or a combination thereof, and the first region F1 may be an entire region other than the second region F2.

In the escape gear portion 200 of the present exemplary embodiment, the thickness $D_{41}$ of the silicon layer 4 in the first region F1 may be from 80 nm to 110 nm, and the thickness $D_{42}$ of the silicon layer 4 in the second region F2 may be from 110 nm to 140 nm.

When the respective thicknesses $D_{41}$ and $D_{42}$ of the silicon layer 4 in the first region F1 and the second region F2 are within the range described above, a color developed from each the region is easily identified. As a result, decorativeness of the escape gear portion 200 can be further improved.

In the case of this aspect, from a perspective of further improving the identifiability and decorativeness, the second F2 region may be a region for displaying a character, a mark, a pattern, or a combination thereof, and the first region F1 may be an entire region other than the second region F2.

Effects

The escape gear portion 200 of the second exemplary embodiment exerts similar effects to those in the first exemplary embodiment.

According to the second exemplary embodiment, the escape gear portion 200 having further excellent decorativeness is realized.

Method for Manufacturing Escape Gear Portion of Second Exemplary Embodiment

The escape gear portion 200 of the second exemplary embodiment is, with respect to the manufacturing method of the first exemplary embodiment, for example, manufactured by changing the position where the resist layer R1 is disposed as the mask, and the place where the silicon layer is etched.

Third Exemplary Embodiment

With respect to a third exemplary embodiment, differences from the second exemplary embodiment will be focused and explained, and descriptions on similar matters will be omitted.

Figure 10:
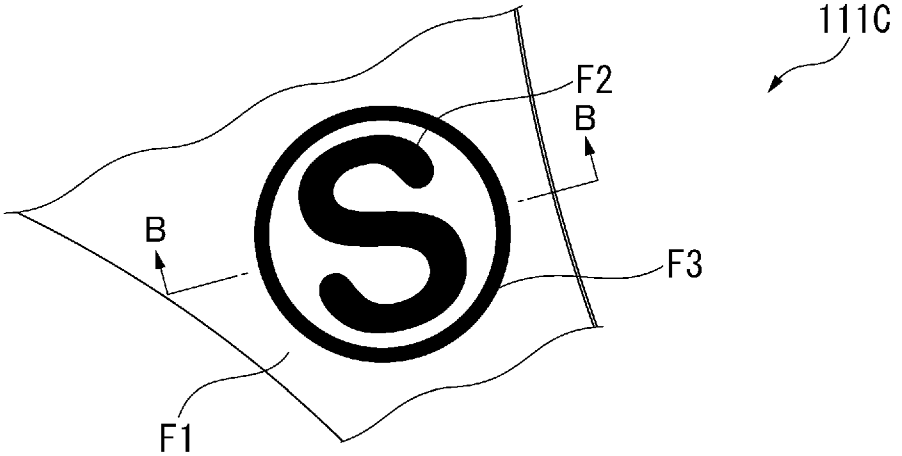
FIG. 10 is a modified example of the X region illustrated in FIG. 3.

An escape gear portion 300 according to the third exemplary embodiment is similar to the escape gear portion 200 according to the second embodiment, except that the X region illustrated in FIG. 3 in the escape gear portion 200 according to the second exemplary embodiment is changed to a region illustrated in FIG. 10.

As illustrated in FIG. 10, a character of "S" and a round mark are displayed so as to be identifiable on a rim portion 111C of the escape gear portion 300 of the third exemplary embodiment. The rim portion 111C of the escape gear portion 300 includes the first region F1, the second region F2, and additionally the third region F3.

In the present exemplary embodiment, the first region F1 is a region in which the character of "S" and the round mark are not displayed, the second region F2 is a region in which the character of "S" is displayed, and the third region F3 is a region in which the round mark is displayed.

The first region F1, the second region F2, and the third region F3 develop respective colors different from each other.

Figure 11:
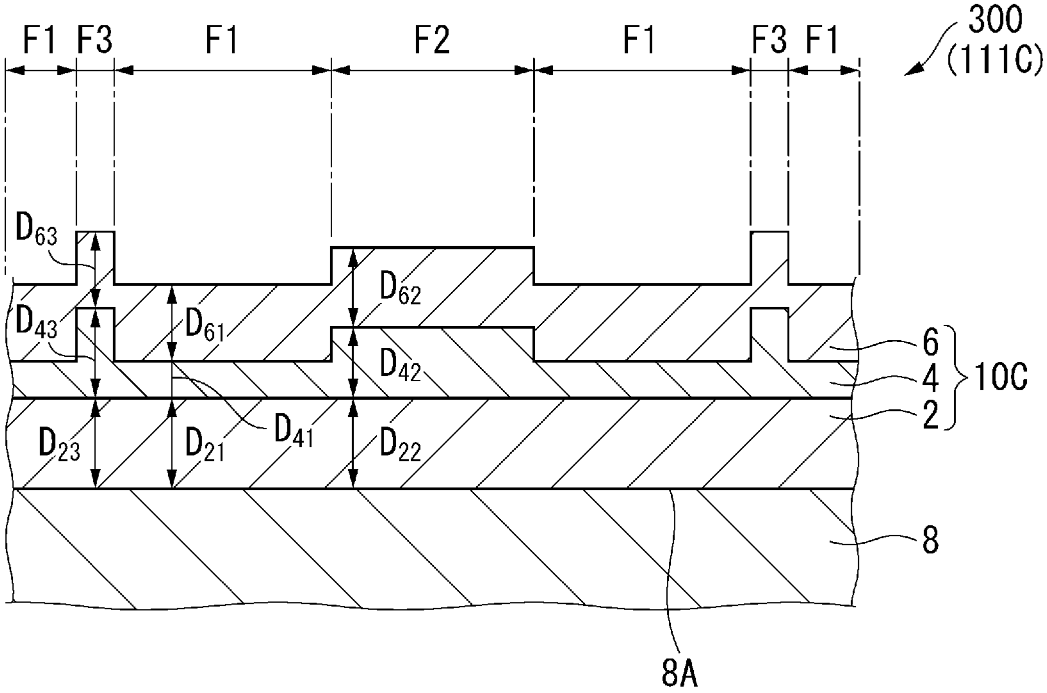
FIG. 11 is a partial cross-sectional view of an escape gear portion according to a third exemplary embodiment.

Cross-sectional structure of the rim portion 111C of the escape gear portion 300 will be described. FIG. 11 is a partial cross-sectional view of the escape gear portion according to the third exemplary embodiment, and is a partial cross-sectional view taken along a line B-B in FIG. 10.

A configuration on a side of the first surface 8A of the substrate 8 will be described.

As illustrated in FIG. 11, a light reflecting layer 10C in which the first silicon oxide layer 2, the silicon layer 4, and the second silicon oxide layer 6 are stacked in this order, is provided on the first surface 8A of the substrate 8.

When the light reflecting layer 10C is viewed in plan view, from the side of the first surface 8A of the substrate 8, the light reflecting layer 10C includes the first region F1, and the second region F2, and the third region F3.

The thickness $D_{41}$ of the silicon layer 4 in the first region F1, and the thickness $D_{42}$ of the silicon layer 4 in the second region F2, and the thickness $D_{43}$ of the silicon layer 4 in the third region F3 are different from each other.

In the present exemplary embodiment, a relationship among the thicknesses $D_{41}$, $D_{42}$, and $D_{43}$ of the silicon layer 4 in the respective regions satisfies the following Equation (2).

The thickness $D_{21}$ of the first silicon oxide layer 2 in the first region F1, and the thickness $D_{22}$ of the first silicon oxide layer 2 in the second region F2, and the thickness $D_{23}$ of the first silicon oxide layer 2 in the third region F3 are an identical dimension.

The thickness $D_{61}$ of the second silicon oxide layer 6 in the first region F1, the thickness $D_{62}$ of the second silicon oxide layer 6 in the second region F2, and the thickness $D_{63}$ of the second silicon oxide layer 6 in the third region F3 are an identical dimension.

In this way, the first silicon oxide layer 2, the silicon layer 4, and the second silicon oxide layer 6 are stacked in this order, such that only the thickness $D_{41}$ of the silicon layer 4 in the first region F1, and the thickness $D_{42}$ of the silicon layer 4 in the second region F2, and the thickness $D_{43}$ of the silicon layer 4 in the third region F3 are different from each other, in the light reflecting layer 10C on the side of the first surface 8A of the substrate 8.

Next, a configuration on respective sides of the second surface 8B, the third surface 8C, and the fourth surface 8D of the substrate 8 will be described. In the present exemplary embodiment, the thickness of the silicon layer on the second surface 8B, the third surface 8C, and the fourth surface 8D of the substrate 8 is an identical dimension to the thickness $D_{41}$ of the silicon layer 4 in the first region F1 of the first surface 8A of the substrate 8.

The thickness of the first silicon oxide layer on the second surface 8B, the third surface 8C, and the fourth surface 8D of the substrate 8 is an identical dimension to the respective thicknesses $D_{21}$, $D_{22}$, and $D_{23}$ of the first silicon oxide layer 2 in the first region F1, the second region F2, and the third region F3 of the first surface 8A of the substrate 8.

The thickness of the second silicon oxide layer on the second surface 8B, the third surface 8C, and the fourth surface 8D of the substrate 8 is an identical dimension to the respective thicknesses $D_{61}$, $D_{62}$, and $D_{63}$ of the second silicon oxide layer 6 in the first region F1, the second region F2, and the third region F3 of the first surface 8A of the substrate 8.

Effects

The escape gear portion 300 of the third exemplary embodiment exerts similar effects as those in the second exemplary embodiment.

In the escape gear portion 300 of the third exemplary embodiment, with respect to the escape gear portion 200 of the second exemplary embodiment, in addition to the first region F1 and the second region F2, a different color can be developed from the third region F3 as well. Thus, according to the third exemplary embodiment, the escape gear portion 300 having further excellent decorativeness is realized.

Method for Manufacturing Escape Gear Portion of Third Exemplary Embodiment

The escape gear portion 300 of the third exemplary embodiment is manufactured, with respect to the manufacturing method of the second exemplary embodiment, by further forming the third region F3 in which the thickness of the silicon layer 4 is $D_{43}$.

The method for forming the third region F3 is not particularly limited, and a known etching method can be used.

Other Exemplary Embodiments

The present disclosure is not limited to the exemplary embodiments described above, and variations, modifications, and the like within the scope in which the object of the present disclosure can be achieved are possible.

In the first exemplary embodiment and the second exemplary embodiment, the example has been described in which the first region F1 and the second region F2 are provided on the first surface 8A of the substrate 8, but the present disclosure is not limited thereto. For example, it is sufficient that the first region and the second region are provided on at least one surface of the first surface 8A, the second surface 8B, the third surface 8C, and the fourth surface 8D of the substrate 8. Further, other regions such as the third region may further be provided on either surface of the first surface 8A, the second surface 8B, the third surface 8C, and the fourth surface 8D of the substrate 8.

In the third exemplary embodiment, the example has been described in which the first region, the second region, and the third region are provided on the first surface 8A of the substrate 8, but the present disclosure is not limited thereto. For example, it is sufficient that the first region, the second region, and the third region are provided on at least one surface of the first surface 8A, the second surface 8B, the third surface 8C, and the fourth surface 8D of the substrate 8. Further, other regions such as a fourth region may further be provided on either surface of the first surface 8A, the second surface 8B, the third surface 8C, and the fourth surface 8D of the substrate 8.

In the above exemplary embodiment, the dimensional difference between the thickness of the silicon layer in the first region and the thickness of the silicon layer in the second region may be from 5 nm to 1000 nm, from the perspective of facilitating identification of the color developed from the first region and the color developed from the second region. In this aspect, each of the thickness of the first silicon oxide layer and the thickness of the second silicon oxide layer may be adjusted, in accordance with the dimensional difference.

In the exemplary embodiment described above, as the watch components, the escape gear portion, and the mechanical watch on which the escape gear portion is mounted have been described, but the present disclosure is not limited thereto.

For example, it is sufficient that the mechanical watch according to the exemplary embodiment is, for example, provided with any one or more of the watch outer packaging components and the watch inner packaging components listed as the watch components.

The escape gear portion according to the exemplary embodiment may have an antifouling layer or an antistatic layer having transparency as the outermost layer, as far as the decorativeness is not impaired. Accordingly, an antifouling function or an antistatic function is imparted to the escape gear portion.

Furthermore, in the method for manufacturing the escape gear portion according to the exemplary embodiment, a process for any objective can be added as necessary. For example, intermediate processing such as washing may be performed between the processes. Further, after the process for forming the second silicon oxide layer, a process for forming an antifouling layer or forming an antistatic layer may be included. The substrate may be subjected to preprocessing such as plough, grinding, polishing, and honing.

Watch Movement

A watch movement according to the present exemplary embodiment includes at least one of the watch components according to the exemplary embodiments. According to the present exemplary embodiment, a watch movement with excellent decorativeness and high designability is realized.

Watch

A watch according to the present exemplary embodiment includes at least one of the watch components according to the exemplary embodiments.

According to the watch according to the present exemplary embodiment, a watch with excellent decorativeness and high designability is realized.

The watch is not particularly limited, and examples thereof include a quartz watch, a mechanical watch, an electronically controlled mechanical watch, and the like. Among others, from a perspective of more expressing decorativeness of watch components, a mechanical watch having see-through structure may be used as the watch.

Application Examples

The present disclosure will be described in further detail hereinafter using application examples, but the present disclosure is not limited to the following application examples unless the spirit of the present disclosure is exceeded.

Manufacturing of Samples 1 to 7

A silicon substrate (diameter 150 mm, thickness 0.1 mm) was prepared.

By the method described above, a light reflecting layer was manufactured in which a first silicon oxide layer, a silicon layer, and a second silicon oxide layer were stacked in this order on a first surface of the silicon substrate. These were used as samples 1 to 7 for evaluation. Layer configurations of the respective samples 1 to 7 are shown in Table 1.

Evaluation

Color Identifiability

The samples 1 to 7 were used to evaluate color identifiability in the following manner. The results are shown in Table 1.

Each the sample was viewed in plan view from a side of the light reflecting layer, and a color was visually confirmed.

Next, the color of the sample 1 was used as a reference, and this color of the sample 1 and the colors of the respective samples 2 to 7 were visually compared, the color identifiability was determined based on the following criteria.

Note that, color development of each of the samples 1 to 7 was favorable.

Criteria

A: The color of each the sample can be sufficiently identified

B: The color of each the sample can be identified

C: cannot be identified.

L*, a* and b*

For the samples 1 to 7, a spectrophotometer (available from Konica Minolta Co., Ltd., part number: CM-700d) was used to measure L*, and b* defined in the CIELLab color space at a measurement environment of 25° C.

Using the obtained and b*, a distance between coordinates of the sample 1 in an a-b plane and coordinates of each of the samples 2 to 7 in the a-b plane was calculated according to the following equation (1). The results are shown in Table 1.

$$\text{The distance between the coordinates of sample 1 and each of the samples 2 to 7}=((a_1-a_x)^2+(b_1-b_x)^2)^{1/2} \quad (1)$$

$a_1$: of the sample 1

$a_x$: of the samples 2 to 7

$b_1$: of the sample 1

$b_x$: of the samples 2 to 7

TABLE 1

| | LAYER CONFIGURATION OF LIGHT REFLECTING LAYER | | | | EVALUATION | | | | |
|---|---|---|---|---|---|---|---|---|---|
| | | SILICON LAYER | | | | | | | |
| | FIRST SILICON OXIDE LAYER [nm] | THICKNESS [nm] | THICKNESS DIFFERENCE FROM SAMPLE 1 [nm] | SECOND SILICON OXIDE LAYER [nm] | IDENTIFIABILITY | L* | a* | b* | DISTANCE TO COORDINATES OF SAMPLE 1 (a-b PLANE) |
| SAMPLE 1 | 220 | 60 | 0 | 140 | — | 41 | 13 | −21 | — |
| SAMPLE 2 | | 65 | 5 | | B | 35 | 45 | −55 | 46.7 |
| SAMPLE 3 | | 70 | 10 | | A | 32 | 55 | −71 | 65.3 |
| SAMPLE 4 | | 75 | 15 | | A | 37 | 38 | −69 | 54.1 |
| SAMPLE 5 | | 80 | 20 | | A | 27 | 37 | −67 | 51.9 |
| SAMPLE 6 | | 85 | 25 | | A | 32 | 7 | −42 | 21.8 |
| SAMPLE 7 | | 90 | 30 | | A | 42 | −26 | −8 | 41.1 |

As shown in Table 1, it was confirmed that different colors can be favorably developed by simply changing the thickness of the silicon layer, of the light reflecting layer, by about 5 nm to 30 nm.

Therefore, it was found that by providing the light reflecting layer in which the first silicon oxide layer, the silicon layer, and the second silicon oxide layer were stacked in this order on the silicon substrate, and by providing the regions in which the respective thicknesses of the silicon layer were different from each other, the watch component having the excellent decorativeness was obtained.

What is claimed is:

1. A watch component, comprising:

a substrate containing silicon as a main component; and a light reflecting layer including a first silicon oxide layer, a silicon layer, and a second silicon oxide layer that are stacked, in this order, at the substrate, wherein when the light reflecting layer is viewed in plan view, the light reflecting layer includes a first region and a second region, a thickness of the silicon layer in the first region is different from a thickness of the silicon layer in the second region, the silicon layer is sandwiched by the first and second silicon oxide layers in the first region and the second region, and the watch component is an escape wheel and pinion, a rim portion of the escape wheel and pinion includes the first region and the second region, and at least a character or a mark is displayed by one of the first region and the second region.

2. A watch, comprising:

a watch component including a substrate containing silicon as a main component, a light reflecting layer including a first silicon oxide layer, a silicon layer, and a second silicon oxide layer that are stacked, in this order, at the substrate, the light reflecting layer, when viewed in plan view, including a first region and a second region, a thickness of the silicon layer in the first region being different from a thickness of the silicon layer in the second region, and the silicon layer is sandwiched by the first and second silicon oxide layers in the first region and the second region; and a watch case configured to house the watch component, wherein the watch component is an escape wheel and pinion, a rim portion of the escape wheel and pinion includes the first region and the second region, and at least a character or a mark is displayed by one of the first region and the second region.

* * * * *